United States Patent [19]

Köster

[11] Patent Number: 5,727,504
[45] Date of Patent: Mar. 17, 1998

[54] MILKING STAND

[75] Inventor: Ludger Köster, Naperville, Ill.

[73] Assignee: Westfalia Separator Aktiengesellschaft, Oelde, Germany

[21] Appl. No.: 612,896
[22] PCT Filed: Dec. 15, 1994
[86] PCT No.: PCT/EP94/04158
  § 371 Date: Feb. 7, 1996
  § 102(e) Date: Feb. 7, 1996
[87] PCT Pub. No.: WO95/22247
  PCT Pub. Date: Aug. 24, 1995

[30] Foreign Application Priority Data

Feb. 22, 1994 [DE] Germany .................. 44 05 512.0

[51] Int. Cl.⁶ ................................. A01K 1/12
[52] U.S. Cl. ................................. 119/520
[58] Field of Search ............... 119/14.01, 14.02, 119/14.03, 14.04, 752, 516

[56] References Cited

U.S. PATENT DOCUMENTS 3,166,044  1/1965  Darling.
3,785,346  1/1974  Dower ................................ 119/27
5,259,335  11/1993 Moreau ......................... 119/520 X
5,285,746  2/1994  Moreau ......................... 119/520 X

*Primary Examiner*—Thomas Price
*Attorney, Agent, or Firm*—Sprung Kramer Schaefer & Briscoe

[57] ABSTRACT

A milking stand having a plurality of adjacent positions accommodating animals to be milked has a barrier at a rear end of the animals to be milked and a horizontal elongated locking component at a front end of the animals to be milked. The locking component has a first wave tube connected thereto and is mounted for vertical movement of the locking component and the first wave tube between a lower position wherein the locking component prevents the animals to be milked from exiting the milking stand and an upper position wherein the locking component does not prevent the animals to be milked from exiting the milking stand. The locking component is mounted for pivoting movement of the locking component and the first wave tube about a longitudinal axis to move the first wave tube into a generally vertical position and into a generally horizontal position when the locking component is in the lower position.

4 Claims, 6 Drawing Sheets

"W"

"X"

"Y"

"Z"

MILKING STAND

BACKGROUND OF THE INVENTION

A milking stand of this type is known from U.S. Pat. No. 5,156,108. A breast-end locking component can be displaced horizontally, providing a wide-open entrance until the stands are occupied. Once the animals are in place, the breast-end locking component is moved toward a rear barrier, optimally orienting the animals for milking. Although the wide-open entrance facilitates occupation of the stands, an irregular structure in the form of lengths of undulating pipes on each side delays it. Furthermore, depending on its extent, the displacement of the breast-end locking component requires more space than in conventional stands.

A milking stand is known from U.S. Pat. No. 4,951,608, wherein a vertically moving smooth and flat barrier allows all the animals to leave the stand simultaneously. This barrier however lacks components that help orient the animals. They can come into contact with the barrier and shoulder smaller animals out of the way. It is also possible for the animals to remain in an orientation that is not ideal for milking.

French 2 565 778 A1 also discloses a milking stand with a barrier with no means of orienting the animals for milking. let them out, the barrier must be pivoted in an arc into a position above the animals. The pivoting motion demands a lot of space. Since there are no means of orienting the animals, there is no problem with allowing them into the system. The same feature, however is a drawback to ideally orienting the animals for milking.

SUMMARY OF THE INVENTION

The object of the present invention is an improved milking stand of the aforesaid type that will ensure its unimpeded and accelerated occupation without taking up much space.

This object is attained in accordance with the present invention by the characteristic recited in the body of claim 1.

The locking component can accordingly be raised from a lowermost position, wherein it prevents the animals from leaving, to an uppermost position wherein it allows them to leave. Since raising the locking component allows all the animals to leave the stand at the same time, they can be replaced particularly rapidly. When the first wave tube is in its mainly vertical position, the entrance will be wide open and the breast-end locking component will constitute a flat demarcation that will prevent the entering animals from crowding together. They can accordingly be driven in essentially more rapidly, which will save time in large parlors in particular. Once the animals are in place, the first wave tube is shifted into its mainly horizontal position, ideally orienting the animals for milking and maintaining them in that orientation.

The locking component in one advantageous embodiment of the present invention has another wave tube next to the first wave tube that can be shifted into a horizontal position by rotating the barrier farther. The second wave tube extends farther radially than the first. The second wave tube moves the animals nearer the rear demarcation, orienting them even more ideally for milking. The second wave tube also makes it possible to orient a group of smaller animals more ideally at the breast end.

The locking component in accordance with the present invention can in one practical procedure be supported in uprights at each end and be actuated by axially displaceable piston rods. Such piston rods can be hydraulically, pneumatically, or electrically operated.

The various positions of the locking components can be attained if the uprights have tracks for the locking components to travel along, moving them vertically when the piston rods are actuated and rotating them once they are in the uppermost and lowermost position in order to shift the wave tubes into their mainly horizontal positions.

The present invention will now be specified with reference to the accompanying drawing, wherein

DETAILED DESCRIPTION OF THE INVENTION

Figure 1:
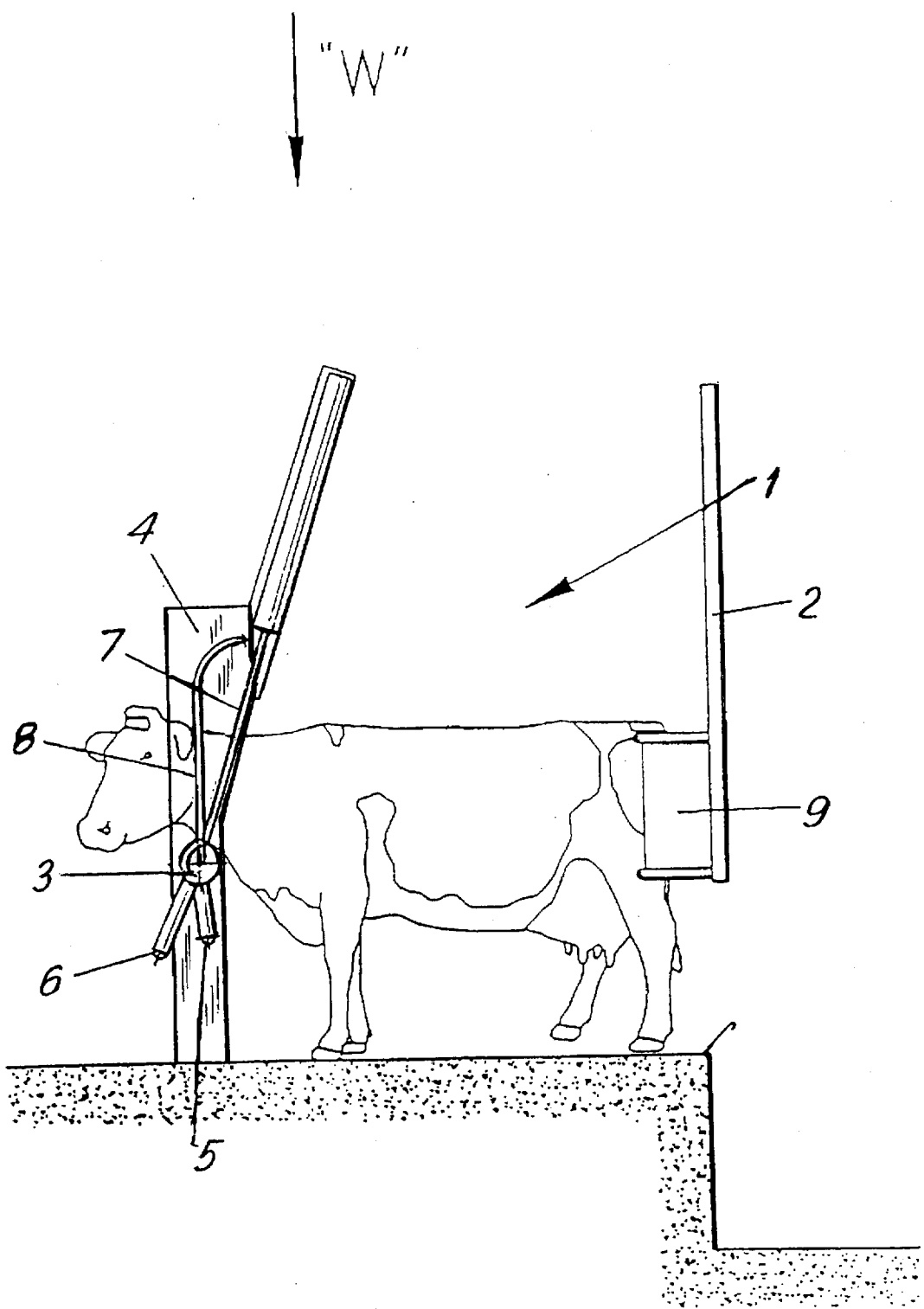
FIG. 1 is a cross-section through the milking stand with the locking component in the animal-access position.

The milking stand 1 illustrated in FIG. 1 has a rear barrier 2 and a breast-end locking component 3. Locking component 3 rotates and travels vertically in uprights 4. Locking component 3 has two mutually displaced wave tubes 5 and 6 of undulating pipe that differ in radial extension. Breast-end locking component 3 is rotated and moved vertically by an axially displaceable piston rod 7 in conjunction with a matching track 8 in uprights 4. The rear barrier is equipped with positioners 9.

Figure 2:
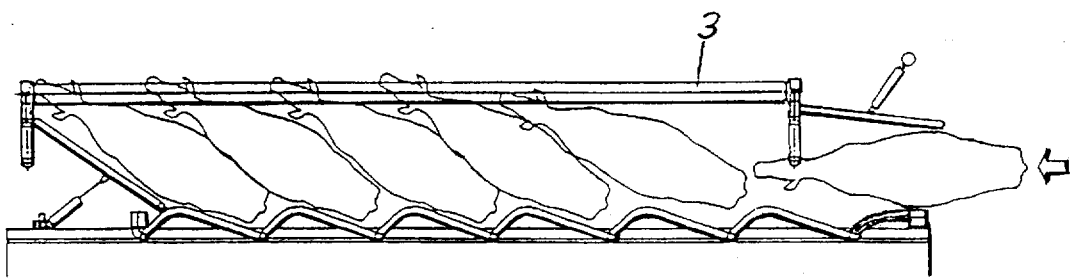
FIG. 2 is a view from the direction indicated by arrow W in FIG. 1.

Wave tubes 5 and 6 remain in a mainly vertical position while the animals are being driven in, providing a wide open entrance and a flat breast-end demarcation. The ample and unimpeded access and resulting rapid occupation of the milking stand available with breast-end locking component 3 in this position will be evident from FIG. 2.

Figure 3:
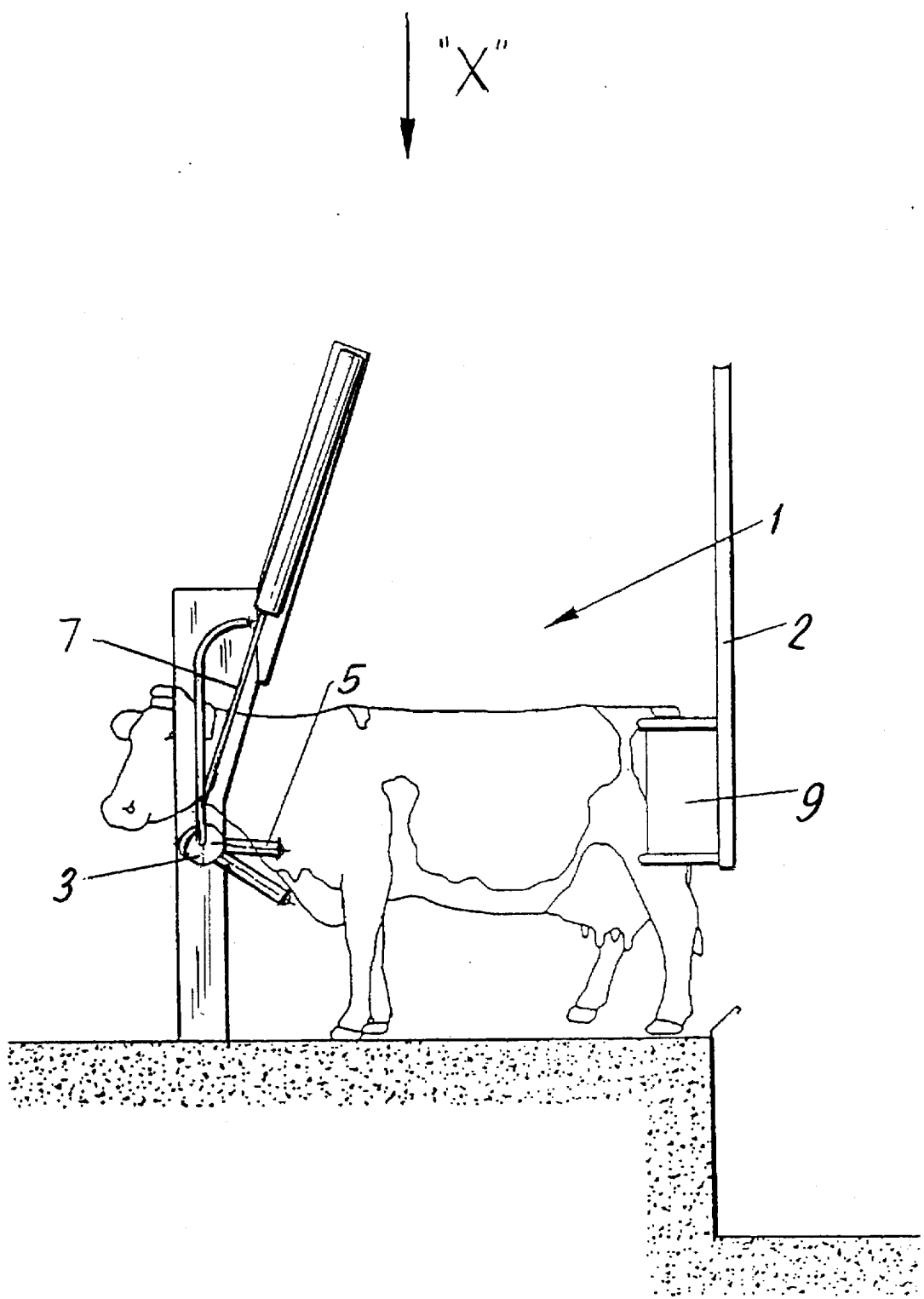
FIG. 3 is a cross-section through the milking stand with the first wave tube in its milking position.

FIG. 3 illustrates first wave tube 5 in a horizontal position, which it has been shifted into by the rotating of breast-end locking component 3 by piston rod 7.

Figure 4:
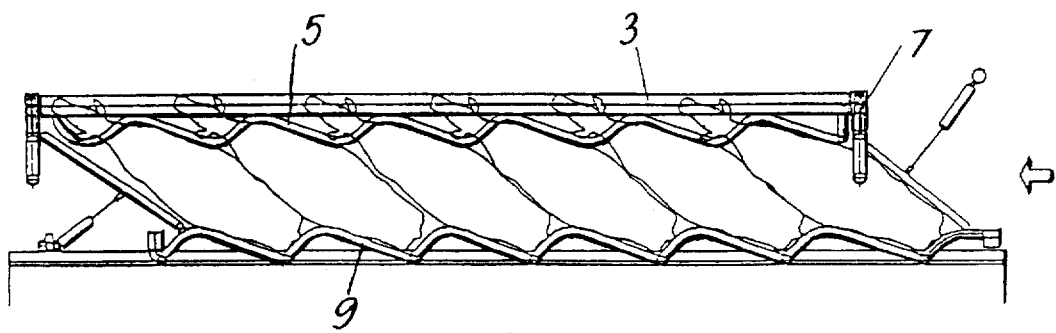
FIG. 4 is a view from the direction indicated by arrow X in FIG. 3.

The animals have been simultaneously ideally oriented for milking by first wave tube 5 in conjunction with positioners 9. This orientation will be evident from FIG. 4.

Figure 5:
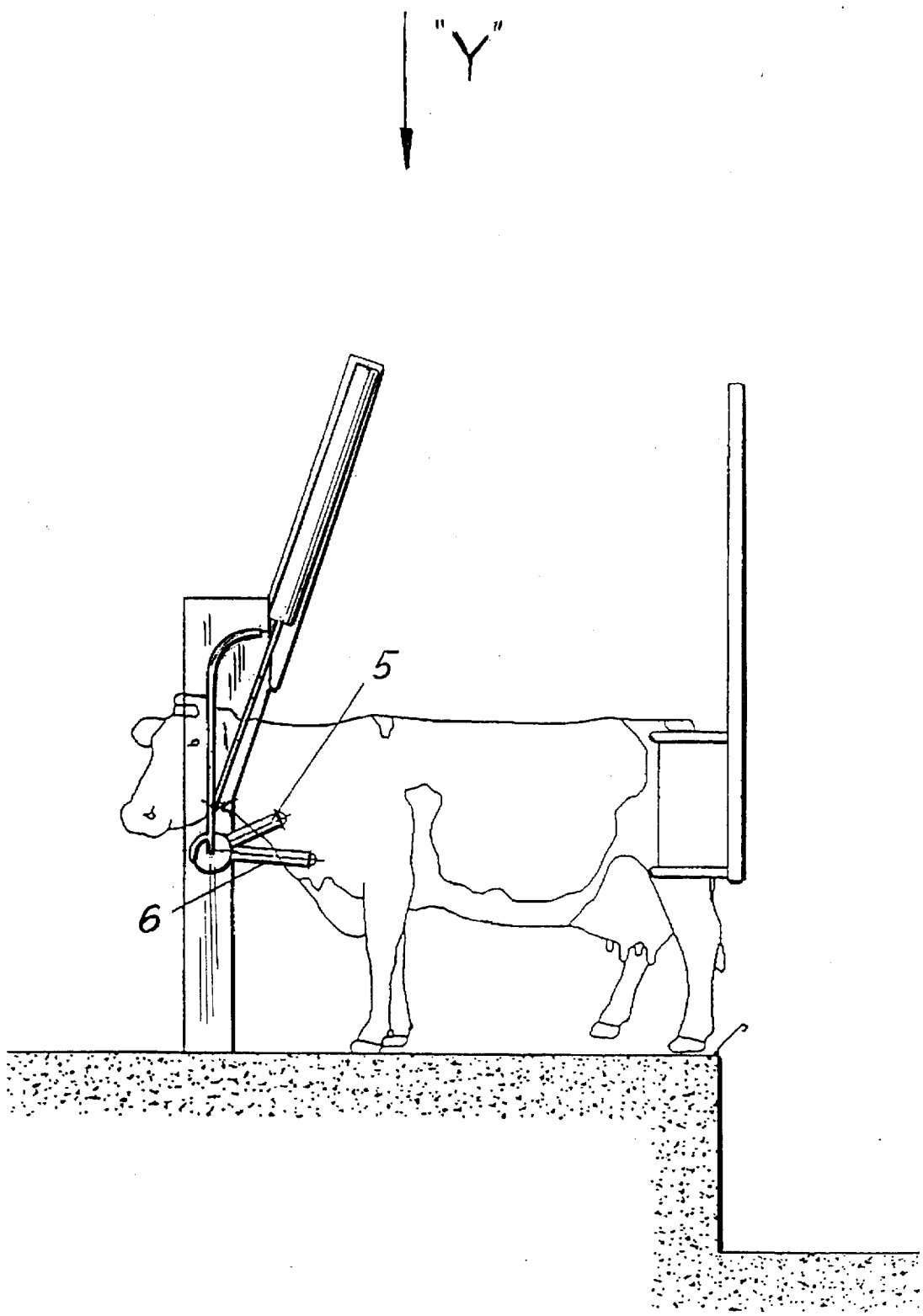
FIG. 5 is a cross-section through the milking stand with the second wave tube in its milking position.
Figure 6:
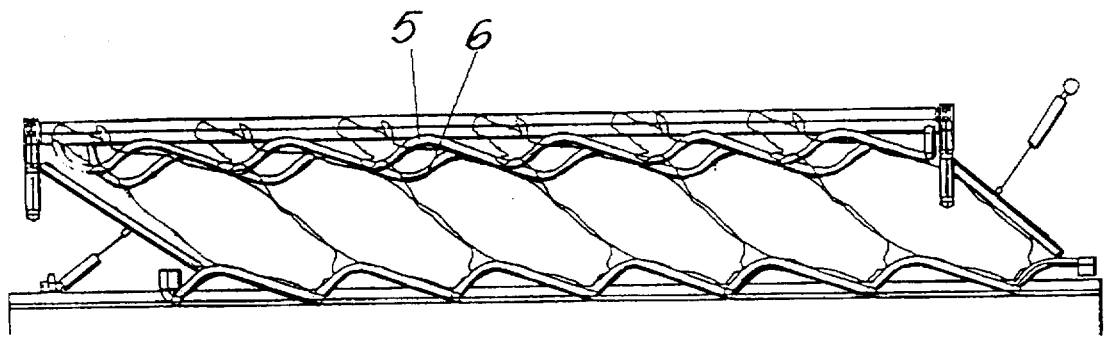
FIG. 6 is a view from the direction indicated by arrow Y in FIG. 5.

The milking orientation can be optimized and adapted to groups with smaller animals by moving second wave tube 6 into the position illustrated in FIGS. 5 and 6.

Figure 8:
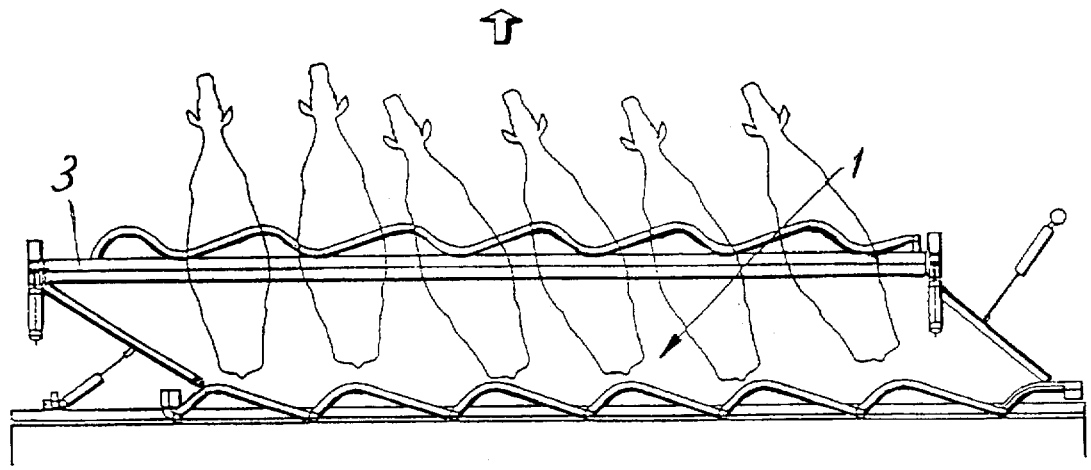
FIG. 8 is a view from the direction indicated by arrow Z in FIG. 7.
Figure 7:
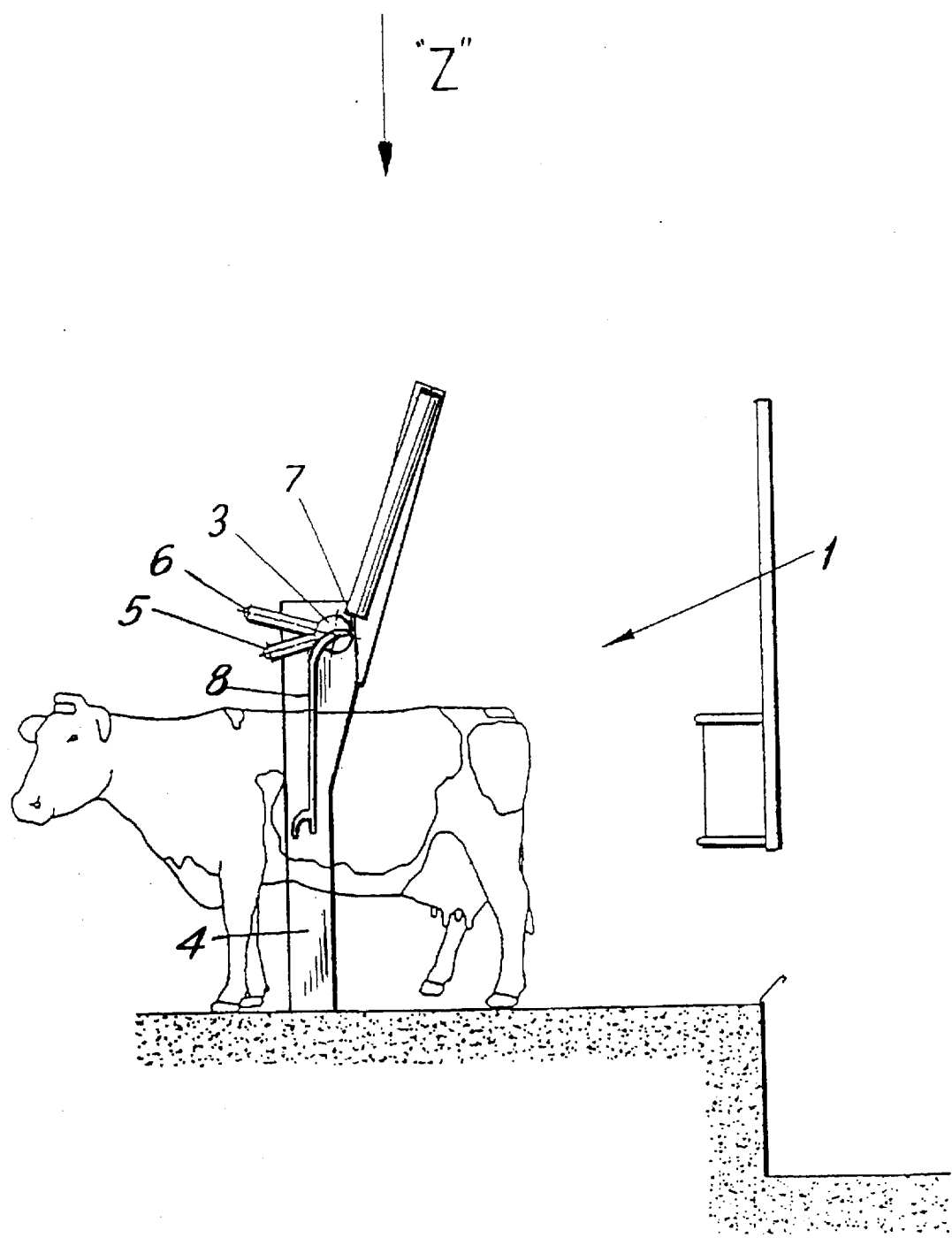
FIG. 7 is a cross-section through the milking stand with the locking component in the animal-release position.

Upon termination of the milking process, breast-end locking component 3 is shifted by piston rod 7 into the uppermost position illustrated in FIG. 7. The tracks 8 in uprights 4 simultaneously shift wave tubes 5 and 6 into a mainly horizontal position. The animals can now, as will be evident from FIG. 8, all leave milking stand 1 at the same time under breast-end locking component 3 and can rapidly be replaced. The horizontal position of wave tubes 5 and 6 can keep the overall upward travel of breast-end locking component 3 short and hence the volume of space occupied low.

What is claimed is:

1. A milking stand having a plurality of adjacent positions accommodating animals to be milked, comprising: a barrier at a rear end of the animals to be milked and a horizontal elongated locking component at a front end of the animals to be milked, wherein the locking component has a first wave tube connected thereto, wherein the locking component is mounted for vertical movement of the locking component and the first wave tube between a lower position wherein the locking component prevents the animals to be milked from exiting the milking stand and an upper position wherein the locking component does not prevent the animals to be milked from exiting the milking stand and wherein the locking component is mounted for pivoting movement of the locking component and the first wave tube about a longitudinal axis to move the first wave tube into a generally vertical position and into a generally horizontal position when the locking component is in the lower position.

2. The milking stand according to claim 1, wherein the locking component has a second wave tube connected thereto and movable with the locking component and wherein the second wave tube extends radially further than the first wave tube.

3. The milking stand according to claim 1, further comprising uprights at each end of the locking component for supporting same and axially displaceable piston rods for moving the locking component both vertically and pivotally.

4. The milking stand according to claim 3, further comprising tracks on the uprights for guiding the vertical and pivotal movement of the locking component.

* * * * *